United States Patent
Geen

(10) Patent No.: US 7,478,557 B2
(45) Date of Patent: Jan. 20, 2009

(54) COMMON CENTROID MICROMACHINE DRIVER

(75) Inventor: John A. Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 440 days.

(21) Appl. No.: 11/241,754

(22) Filed: Sep. 30, 2005

(65) Prior Publication Data

US 2006/0144174 A1 Jul. 6, 2006

Related U.S. Application Data

(60) Provisional application No. 60/615,045, filed on Oct. 1, 2004.

(51) Int. Cl.
*G01P 9/04* (2006.01)
*G01C 19/56* (2006.01)

(52) U.S. Cl. .................. 73/504.14; 73/504.12

(58) Field of Classification Search .......... 73/504.04, 73/504.12, 504.14, 514.32, 514.36, 514.38
See application file for complete search history.

(56) References Cited

U.S. PATENT DOCUMENTS

| | | | |
|---|---|---|---|
| 2,309,853 A | 2/1943 | Lyman et al. | |
| 4,381,672 A | 5/1983 | O'Connor et al. | 73/505 |
| 4,510,802 A | 4/1985 | Peters | 73/505 |
| 4,524,619 A | 6/1985 | Staudte | 73/505 |
| 4,598,585 A | 7/1986 | Boxenhorn | 73/505 |
| 4,654,663 A | 3/1987 | Alsenz et al. | 73/517 |
| 4,744,248 A | 5/1988 | Stewart | 73/505 |
| 4,744,249 A | 5/1988 | Stewart | 73/505 |
| 4,884,446 A | 12/1989 | Ljung | 73/505 |
| 5,016,072 A | 5/1991 | Greiff | 357/26 |
| 5,016,076 A | 5/1991 | Darwish | 357/38 |
| 5,025,346 A | 6/1991 | Tang et al. | 361/283 |
| 5,056,366 A | 10/1991 | Fersht et al. | 73/505 |
| 5,111,693 A | 5/1992 | Greiff | 73/514 |
| 5,144,184 A | 9/1992 | Greiff | 310/312 |
| 5,195,371 A | 3/1993 | Greiff | 73/505 |
| 5,203,208 A | 4/1993 | Bernstein | 73/505 |
| 5,216,490 A | 6/1993 | Greiff et al. | 73/517 |
| 5,241,861 A | 9/1993 | Hulsing, II | 73/505 |
| 5,259,247 A | 11/1993 | Bantien | 73/718 |
| 5,273,939 A | 12/1993 | Becker et al. | 437/209 |
| 5,313,835 A | 5/1994 | Dunn | 73/505 |
| 5,329,815 A | 7/1994 | Dunn et al. | 73/505 |

(Continued)

FOREIGN PATENT DOCUMENTS

WO    WO 93/05401    3/1993

(Continued)

OTHER PUBLICATIONS

Weinberg et al., *A Micromachined Comb-Drive Tuning Fork Rate Gyroscope*, Proceedings of the 49th Annual Meeting of the Institute of Navigation, Jun. 21-23, 1993, 7 pages.

(Continued)

*Primary Examiner*—Helen C. Kwok
(74) *Attorney, Agent, or Firm*—Bromberg & Sunstein LLP

(57) ABSTRACT

A drive arrangement for a micromachine includes a plurality of fixed electrodes arranged so as to have a common centroid.

18 Claims, 8 Drawing Sheets

U.S. PATENT DOCUMENTS

| | | | | |
|---|---|---|---|---|
| 5,341,682 | A | 8/1994 | Hulsing, II | 73/505 |
| 5,343,749 | A | 9/1994 | Macy | 73/505 |
| 5,349,855 | A | 9/1994 | Bernstein et al. | 73/505 |
| 5,359,893 | A | 11/1994 | Dunn | 73/505 |
| 5,367,217 | A | 11/1994 | Norling | 310/370 |
| 5,377,544 | A | 1/1995 | Dunn | 73/505 |
| 5,392,650 | A | 2/1995 | O'Brien et al. | 73/517 |
| 5,408,877 | A | 4/1995 | Greiff et al. | 73/505 |
| 5,481,914 | A | 1/1996 | Ward | 73/504.16 |
| 5,492,596 | A | 2/1996 | Cho | 156/632.1 |
| 5,496,436 | A | 3/1996 | Bernstein et al. | 156/628.1 |
| 5,505,084 | A | 4/1996 | Greiff et al. | 73/504.14 |
| 5,511,419 | A | 4/1996 | Dunn | 73/504.08 |
| 5,515,724 | A | 5/1996 | Greiff et al. | 73/504.12 |
| 5,530,342 | A | 6/1996 | Murphy | 324/158.1 |
| 5,535,902 | A | 7/1996 | Greiff | 216/2 |
| 5,537,872 | A | 7/1996 | Frere et al. | 73/504.12 |
| 5,555,765 | A | 9/1996 | Greiff | 73/504.09 |
| 5,574,222 | A | 11/1996 | Offenberg | 73/514.32 |
| 5,581,035 | A | 12/1996 | Greiff | 73/514.32 |
| 5,600,064 | A | 2/1997 | Ward | 73/504.04 |
| 5,600,065 | A | 2/1997 | Kar et al. | 73/504.12 |
| 5,604,309 | A | 2/1997 | Ward | 73/504.02 |
| 5,604,312 | A | 2/1997 | Lutz | 73/504.14 |
| 5,608,351 | A | 3/1997 | Ward | 330/107 |
| 5,635,638 | A | 6/1997 | Geen | 73/504.04 |
| 5,635,639 | A | 6/1997 | Greiff et al. | 73/504.04 |
| 5,635,640 | A | 6/1997 | Geen | 73/504.12 |
| 5,646,348 | A | 7/1997 | Greiff et al. | 73/514.36 |
| 5,650,568 | A | 7/1997 | Greiff et al. | 73/504.09 |
| 5,672,949 | A | 9/1997 | Ward | 318/609 |
| 5,696,323 | A | 12/1997 | Hulsing, II | 73/504.12 |
| 5,717,140 | A | 2/1998 | Hulsing, II | 73/504.16 |
| 5,734,105 | A | 3/1998 | Mizukoshi | 73/504.02 |
| 5,747,961 | A | 5/1998 | Ward et al. | 318/646 |
| 5,763,781 | A | 6/1998 | Netzer | 73/504.16 |
| 5,767,405 | A | 6/1998 | Bernstein et al. | 73/504.16 |
| 5,783,973 | A | 7/1998 | Weinberg et al. | 331/35 |
| 5,795,988 | A | 8/1998 | Lo et al. | 73/1.77 |
| 5,796,001 | A | 8/1998 | Greiff et al. | 73/504.16 |
| 5,869,760 | A | 2/1999 | Geen | 73/504.12 |
| 5,880,369 | A * | 3/1999 | Samuels et al. | 73/514.32 |
| 5,886,816 | A | 3/1999 | Faris | 359/464 |
| 5,892,153 | A | 4/1999 | Weinberg et al. | 73/504.16 |
| 5,895,850 | A | 4/1999 | Buestgens | 73/504.12 |
| 5,895,851 | A * | 4/1999 | Kano et al. | 73/504.04 |
| 5,911,156 | A | 6/1999 | Ward et al. | 73/504.16 |
| 5,918,280 | A | 6/1999 | Gang et al. | 73/504.12 |
| 5,920,012 | A | 7/1999 | Pinson | 73/504.12 |
| 5,945,600 | A | 8/1999 | Touge et al. | 73/504.14 |
| 5,952,572 | A | 9/1999 | Yamashita et al. | 73/504.04 |
| 5,955,668 | A | 9/1999 | Hsu et al. | 73/504.12 |
| 5,987,986 | A | 11/1999 | Wyse et al. | 73/504.12 |
| 5,992,233 | A | 11/1999 | Clark | 73/514.35 |
| 6,009,751 | A | 1/2000 | Ljung | 73/504.02 |
| 6,032,531 | A | 3/2000 | Roszhart | 73/504.04 |
| 6,044,707 | A | 4/2000 | Kato | 73/504.14 |
| 6,064,169 | A | 5/2000 | Ward et al. | 318/646 |
| 6,067,858 | A | 5/2000 | Clark et al. | 73/504.16 |
| 6,070,463 | A | 6/2000 | Moriya et al. | 73/504.12 |
| 6,070,464 | A | 6/2000 | Koury, Jr. et al. | 73/514.32 |
| 6,089,089 | A * | 7/2000 | Hsu | 73/504.12 |
| 6,122,961 | A | 9/2000 | Geen et al. | 73/504.12 |
| 6,128,953 | A | 10/2000 | Mizukoshi | 73/504.02 |
| 6,134,961 | A * | 10/2000 | Touge et al. | 73/504.12 |
| 6,155,115 | A | 12/2000 | Ljung | 73/504.12 |
| 6,164,134 | A | 12/2000 | Cargille | 73/504.02 |
| 6,189,381 | B1 | 2/2001 | Huang et al. | 73/504.12 |
| 6,190,571 | B1 | 2/2001 | Kato | 216/2 |
| 6,230,563 | B1 | 5/2001 | Clark et al. | 73/504.04 |
| 6,250,156 | B1 | 6/2001 | Seshia et al. | 73/502.12 |
| 6,250,157 | B1 | 6/2001 | Touge | 73/504.12 |
| 6,257,059 | B1 | 7/2001 | Weinberg et al. | 73/504.16 |
| 6,282,960 | B1 | 9/2001 | Samuels et al. | 73/514.32 |
| 6,289,733 | B1 | 9/2001 | Challoner et al. | 73/504.12 |
| 6,311,555 | B1 | 11/2001 | McCall et al. | 73/488 |
| 6,321,598 | B1 | 11/2001 | Iwaki et al. | 73/504.02 |
| 6,487,908 | B2 | 12/2002 | Geen et al. | 73/504.12 |
| 6,505,511 | B1 | 1/2003 | Geen et al. | 73/504.12 |
| 6,509,670 | B2 | 1/2003 | Jeong et al. | 310/309 |
| 6,516,666 | B1 | 2/2003 | Li | 73/504.12 |
| 6,561,029 | B2 | 5/2003 | Folkmer et al. | 73/504.14 |
| 6,742,389 | B2 | 6/2004 | Nguyen et al. | 73/504.12 |
| 6,767,758 | B1 | 7/2004 | Geen | 438/48 |
| 6,848,304 | B2 | 2/2005 | Geen | 73/504.04 |
| 6,860,151 | B2 | 3/2005 | Flatt et al. | 73/504.16 |
| 6,877,374 | B2 | 4/2005 | Geen | 73/504.14 |
| 7,032,451 | B2 | 4/2006 | Geen | 73/504.14 |
| 7,036,372 | B2 | 5/2006 | Chojnacki et al. | 73/504.12 |
| 7,036,373 | B2 * | 5/2006 | Johnson et al. | 73/504.14 |
| 7,089,792 | B2 | 8/2006 | Geen | 73/504.14 |
| 7,093,487 | B2 * | 8/2006 | Mochida | 73/504.14 |
| 7,134,340 | B2 | 11/2006 | Samuels et al. | 73/514.32 |
| 7,204,144 | B2 | 4/2007 | Geen | 73/504.14 |
| 7,216,539 | B2 | 5/2007 | Geen | 73/504.14 |
| 7,267,006 | B2 * | 9/2007 | Malvern | 73/514.32 |
| 7,287,428 | B2 | 10/2007 | Geen | 73/504.12 |
| 7,347,094 | B2 | 3/2008 | Geen et al. | 73/504.12 |
| 7,357,025 | B2 | 4/2008 | Geen | 73/504.12 |
| 2003/0005767 | A1 | 1/2003 | Hulsing, II | 73/514.02 |
| 2003/0131664 | A1 | 7/2003 | Mochida et al. | 73/504.12 |
| 2003/0131669 | A1 | 7/2003 | Osawa | 73/861.355 |
| 2003/0200806 | A1 | 10/2003 | Geen et al. | 73/504.14 |
| 2005/0066728 | A1 | 3/2005 | Chojnacki et al. | 73/514.16 |
| 2005/0072231 | A1 | 4/2005 | Chojnacki et al. | 73/504.14 |
| 2006/0230830 | A1 | 10/2006 | Geen et al. | 73/514.29 |

FOREIGN PATENT DOCUMENTS

| | | |
|---|---|---|
| WO | WO 96/39615 | 12/1996 |
| WO | WO 01/79862 | 10/2001 |

OTHER PUBLICATIONS

Seshia et al., *Integrated Microelectromechanical Resonant Output Gyroscope*, updated, online <http://hera.berkeley.edu/IRO/Summary/o1abstracts/aseshia.1.html>, printed Feb. 6, 2002, 2 pages.

Geen et al., *Single-Chip Surface Micromachined Integrated Gyroscope with 50°/h Allan Deviation*, IEEE Journal of Solid-State Circuits, vol. 37, No. 12, Dec. 2002, 7 pages.

Unknown, *A Comb-drive Piezoresistive Vibratory Gyroscope*, online <http://mems.stanford.edu/~lian/gyro.html>, printed Feb. 6, 2002, 4 pages.

Geen et al., *New iMEMS® Angular-Rate-Sensing Gyroscope*, Analog Dialogue 37-03 (2003), 4 pages.

* cited by examiner

COMMON CENTROID MICROMACHINE DRIVER

CROSS-REFERENCE TO RELATED APPLICATIONS

This patent application claims priority from U.S. Provisional Patent Application No. 60/615,045, which was filed on Oct. 1, 2004 in the name of John A. Geen, and is hereby incorporated herein by reference in its entirety.

FIELD OF THE INVENTION

The invention generally relates to micromachines and, more particularly, the invention relates to drivers for micromachines.

BACKGROUND OF THE INVENTION

Microelectromechanical systems ("MEMS," also referred to as "MEMS devices") are a specific type of integrated circuit used in a growing number of applications. For example, gyroscopes and accelerometers can be formed as MEMS devices. In simplified terms, such MEMS devices typically have one or more movable structures suspended above a substrate, and associated circuitry (on chip or off chip) that both senses movement of the suspended structure(s) and delivers the sensed movement data to one or more external devices (e.g., an external computer). The external device processes the sensed data to calculate the property being measured (e.g., rotational or linear motion).

Distortion of the geometry of a MEMS device having an oscillating mass, such as a gyroscope, can produce an imbalance in the forces transverse to a longitudinal drive finger. This imbalance can cause a net force that is indistinguishable from a Coriolis force. Consequently, a gyroscope can produce false outputs. There are at least two sources of these geometric distortions. One arises from surface shear of the substrate (e.g., from release/wafer curvature on dicing). Another arises from differential expansion of the package and applied accelerations (e.g., diagonally, G×G).

SUMMARY OF THE INVENTION

In accordance with one aspect of the invention, a MEMS device has drive structure arranged to cancel out net forces produced by geometric distortions. One embodiment has a drive array with a common centroid, which causes the effects of the distortion to substantially cancel.

In accordance with another aspect of the invention there is provided apparatus comprising a resonator mass movable along an axis and a drive arrangement for moving the mass along the axis, the drive arrangement having a plurality of fixed electrodes operably coupled so as to have a common centroid.

In accordance with yet another aspect of the invention there is provided apparatus comprising a plurality of resonator masses, each resonator mass associated with at least one drive arrangement for moving the mass along an axis, each drive arrangement having a plurality of fixed electrodes operably coupled so as to have a common centroid. For example, the plurality of resonator masses may include two masses operably coupled to resonate in anti-phase with one another. Furthermore, each of the masses may be split into two interconnected lobes, where each lobe is associated with a drive arrangement.

In exemplary embodiments of the invention, each fixed electrode typically includes a plurality of fixed fingers that interdigitate with corresponding drive fingers of the mass such that there is a region in which the fixed fingers overlap with the drive fingers. The fixed electrodes may be arranged such that the center lines of the overlap regions associated with adjacent fixed electrodes are co-linear and parallel to the axis.

In related embodiments, the drive arrangement may comprise four fixed electrodes including a first fixed electrode oriented in a first direction, a second fixed electrode adjacent to the first fixed electrode and oriented in a second direction opposite the first direction, a third fixed electrode opposite the first fixed electrode and oriented in the second direction, and a fourth fixed electrode opposite the second fixed electrode and oriented in the first direction. In such embodiments, the first and fourth fixed electrodes operate in phase with one another, while the second and third fixed electrodes operate in phase with one another and in anti-phase with the first and fourth fixed electrodes.

In other related embodiments, the drive arrangement may comprise eight fixed electrodes including a first fixed electrode oriented in a first direction, a second fixed electrode adjacent to the first fixed electrode and oriented in a second direction opposite the first direction, a third fixed electrode adjacent to the second fixed electrode and oriented in the second direction, a fourth fixed electrode adjacent to the third fixed electrode and oriented in the first direction, a fifth fixed electrode opposite the first fixed electrode and oriented in the second direction, a sixth fixed electrode opposite the second fixed electrode and oriented in the first direction, a seventh fixed electrode opposite the third fixed electrode and oriented in the first direction, and an eighth fixed electrode opposite the fourth fixed electrode and oriented in the second direction. In such embodiments, the first, fourth, sixth, and seventh fixed electrodes operate in phase with one another, while the second, third, fifth, and eighth fixed electrodes operate in phase with one another and in anti-phase with the first, fourth, sixth, and seventh fixed electrodes.

In still other related embodiments, the drive arrangement may comprise six fixed electrodes including a first fixed electrode oriented in a first direction, a second fixed electrode adjacent to the first fixed electrode and oriented in a second direction opposite the first direction, a third fixed electrode adjacent to the second fixed electrode and oriented in the first direction, a fourth fixed electrode opposite the first fixed electrode and oriented in the second direction, a fifth fixed electrode opposite the second fixed electrode and oriented in the first direction, and a sixth fixed electrode opposite the third fixed electrode and oriented in the second direction. In such embodiments, the first, third, and fifth fixed electrodes operate in phase with one another, while the second, fourth, and sixth fixed electrodes operate in phase with one another and in anti-phase with the first, third, and fifth fixed electrodes. The first, third, fourth, and sixth electrodes may be substantially identical to one another and the second and fifth fixed electrodes may be substantially identical to one another and approximately twice the size of the first, third, fourth, and sixth fixed electrodes.

In various embodiments, each fixed electrode may include at least two outer sections anchored to an underlying substrate and a middle section suspended from the outer sections so as to float above the underlying substrate. The outer sections may be anchored using an elongated anchor or a plurality of anchors. The resonator mass(es) may be suspended within a frame that is movably coupled to an underlying substrate.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments, a MEMS device has a drive array with a common centroid to cancel out unintended forces produced by geometric distortions. Details of illustrative embodiments are discussed below.

Figure 1:
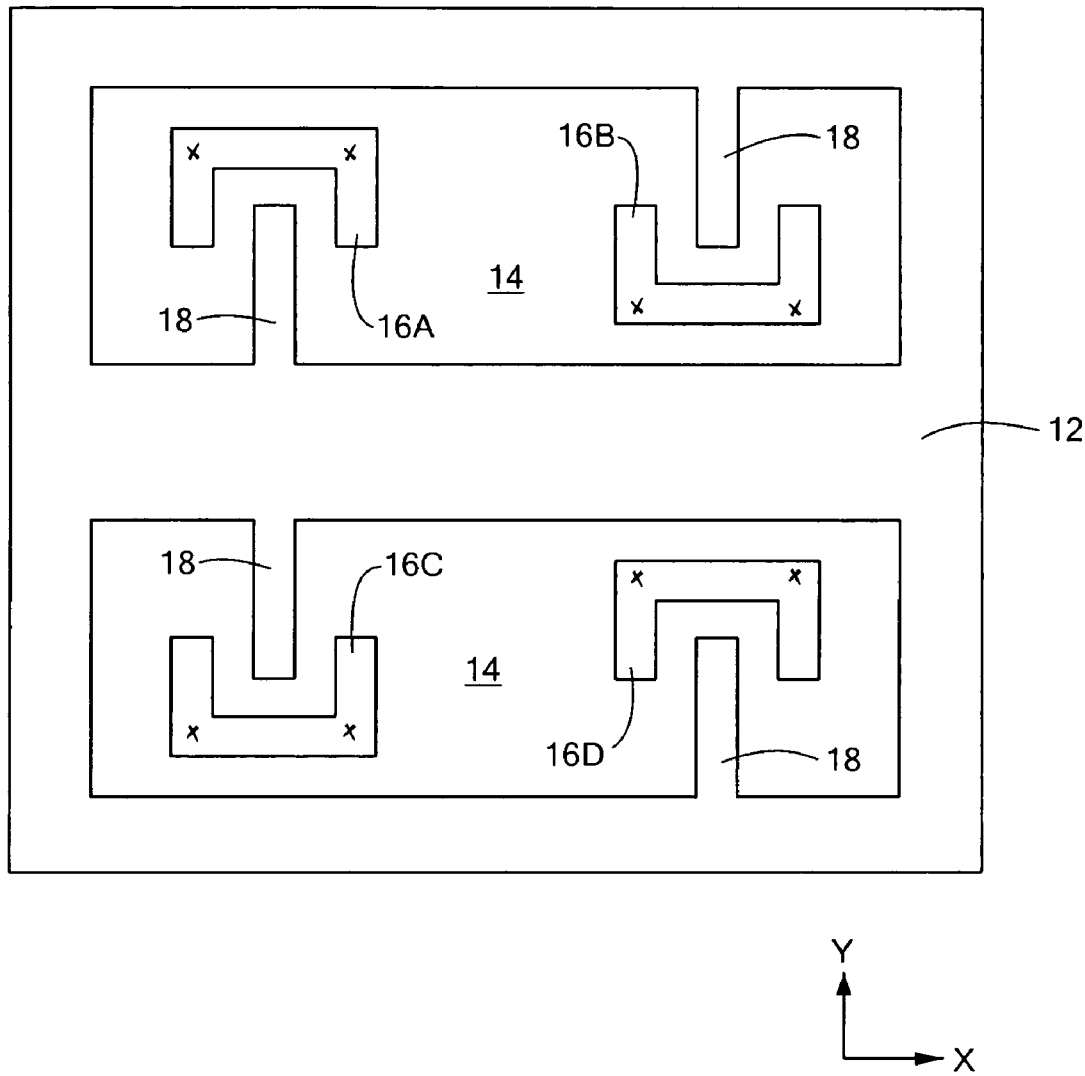
FIG. 1 schematically shows a top view of a generic MEMS gyroscope having a drive system arranged in accordance with illustrative embodiments of the invention.

FIG. 1 schematically shows a top view of a generic gyroscope having a drive array that cancels out the noted unintended forces. For simplicity and to focus of embodiments of the invention, many of the features of the gyroscope are not shown in this drawing. The gyroscope has a movable mass 12 suspended above a substrate 14. The mass 12 is oscillated in the Y-direction by its interaction with a set of four fixed drive electrodes 16A-16D. To that end, the mass 12 has corresponding drive fingers 18 that more directly interact with the fixed electrodes 16A-16D. The gyroscope detects rotation for the oscillatory Coriolis force it induces in the X direction.

The four fixed electrodes 16A-16D shown are considered to form two pairs of diagonally opposed sets. Specifically, the first pair includes fixed electrodes 16A and 16D, while the second pair includes fixed electrodes 16B and 16C. Fixed electrodes 16A and 16D thus operate in phase with each other, while fixed electrodes 16B and 16C also operate in phase with each other. The first pair of fixed electrodes, however, operates 180 degrees out of phase with the second pair of fixed electrodes. Accordingly, while fixed electrodes 16A and 16D are positively polarized, fixed electrodes 16B and 16C are negatively polarized.

Figure 2:
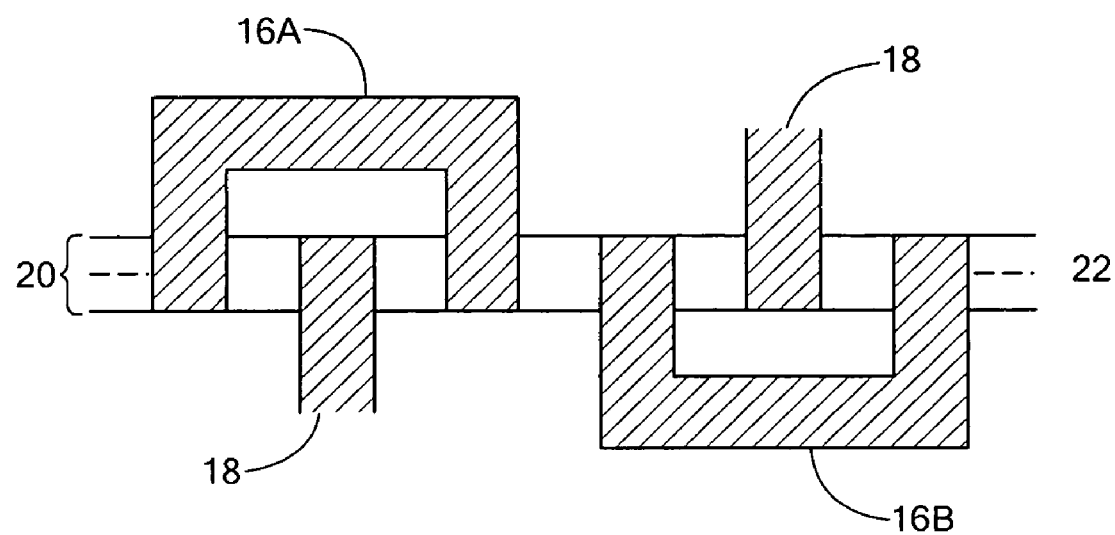
FIG. 2 schematically shows the relationship between overlapping regions of adjacent drive array structures arranged in accordance with illustrative embodiments of the invention.
Figure 3:
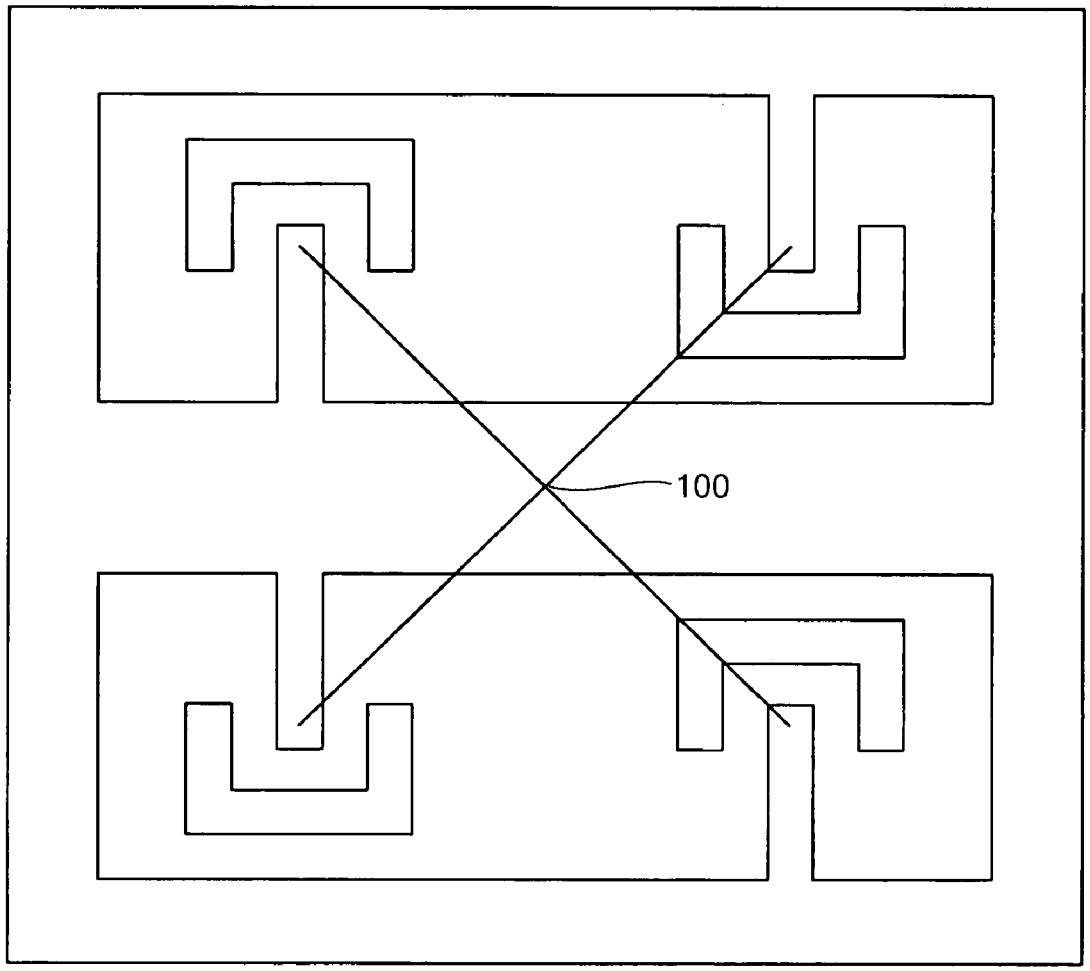
FIG. 3 schematically shows the common centroid of the drive system shown in FIG. 1.

This arrangement and polarization of the fixed electrodes 16A-16D should reduce unintended forces produced by the discussed geometric distortions. For example, a shift of the mass 12 along the X-axis (relative to the fixed electrodes 16A-D) may cause gap imbalance of the fixed electrodes 16A and 16C to produce an oscillatory torque about an axis perpendicular to the X/Y plane. Similarly, rotation of the mass 12 (relative to the fixed electrodes 16A-D) may cause gap imbalance of the fixed electrodes 16A and 16C to produce an oscillatory translational force along the X axis. To counteract these effects, however, the fixed electrodes 16B and 16D produce substantially equal but opposite effects provided that the center lines of the overlapping regions associated with adjacent pairs of fixed electrodes (i.e., 16A/B and 16C/D) are parallel to the X axis, as shown in FIG. 2. Specifically, with reference to FIG. 2, each pair of adjacent fixed electrodes (in this example, 16A and 16B) and their corresponding drive fingers 18 are configured so that the center line 22 of the overlapping region 20 (i.e., the region in which the fixed electrode fingers overlap with the drive fingers) is parallel to the X axis. As shown in FIG. 3, this drive arrangement has a common centroid substantially at point 100.

The counteracting effects noted above should enable the drive system to oscillate the mass 12 in the intended direction; namely, along the Y-axis. This solution, however, may not remedy other problems that could cause off axis movement. For example, this solution does not necessarily compensate for off-axis oscillation due to tolerances.

Figure 4:
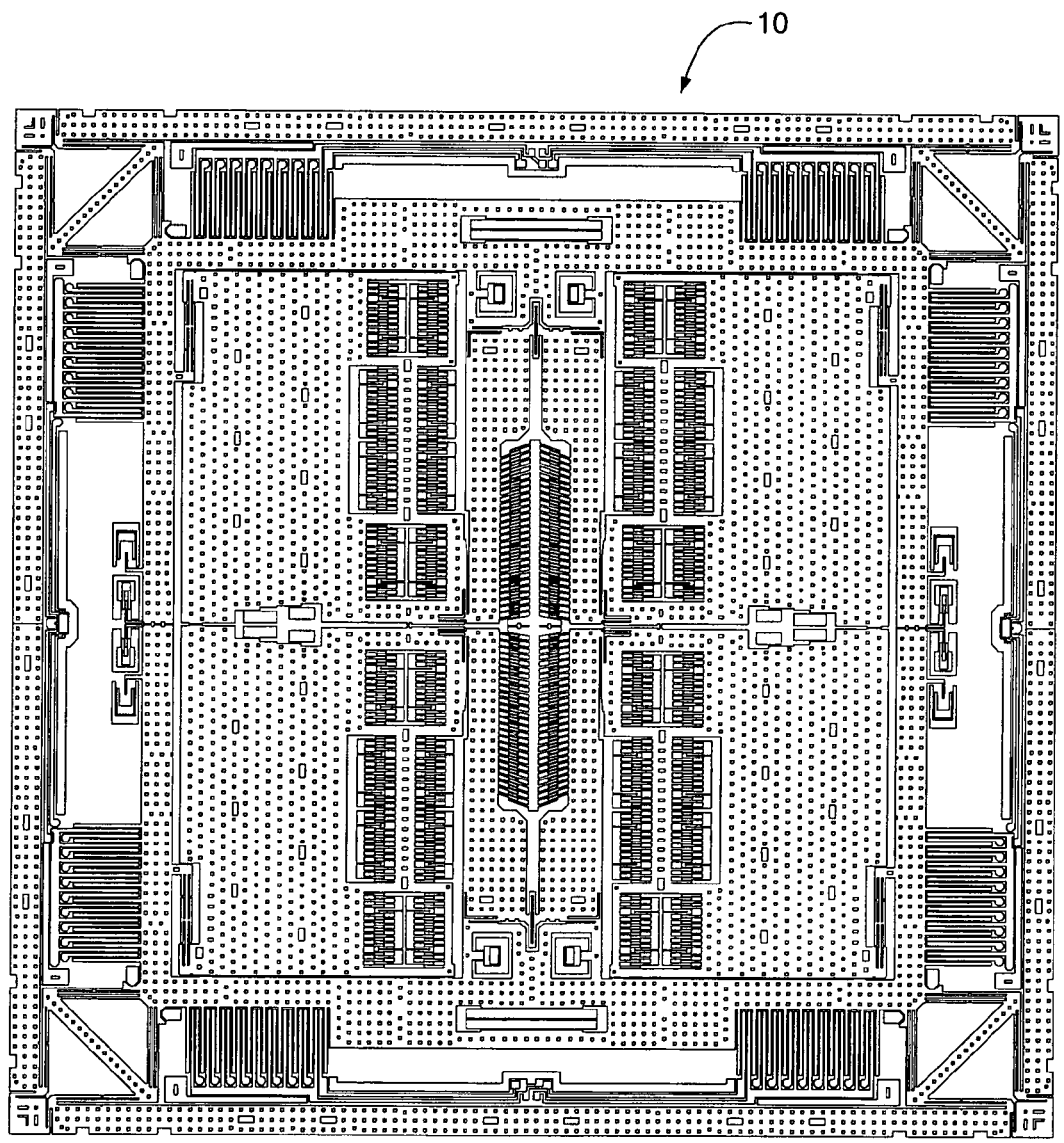
FIG. 4 schematically shows a top view of another MEMS gyroscope configured in accordance with illustrative embodiments of the invention.

FIG. 4 schematically shows a top view of another MEMS gyroscope 10 configured in accordance with illustrative embodiments of the invention. As shown, the gyroscope 10 has four substantially identical drive arrangements that oscillate a pair of movable masses. The pair of movable masses operate in anti-phase with one another. Each movable mass is split into two interconnected lobes, which allows for slight rotation of the lobes as they resonate in order to reduce longitudinal stresses in various levers and flexures. Each lobe is associated with a drive arrangement. The four lobes are interconnected through various levers, pivot flexures, and forks in order to produce a single resonance frequency for the entire resonating system. Rotation of the micromachined gyroscope about the plane produces a rotational force on the frame. The frame is suspended (in this exemplary embodiment, by box suspensions) in such a way that its motion is severely restricted in all but the rotational direction. Sensors on all sides of the frame detect the rotational deflection of the frame for measuring the change in direction. General operation of the gyroscope 10, including the split masses and various other resonator structures (e.g., suspensions, flexures, pivots, and levers), is described in the following commonly owned patent applications, which are hereby incorporated herein by reference in their entireties:

U.S. patent application Ser. No. 10/360,987 entitled MICROMACHINED GYROSCOPE, which was filed on Feb. 6, 2003 in the name of John A. Geen; and U.S. patent application Ser. No. 10/646,332 entitled MICROMACHINED APPARATUS UTILIZING BOX SUSPENSIONS, which was filed on Aug. 22, 2003 in the name of John A. Geen.

Figure 5:
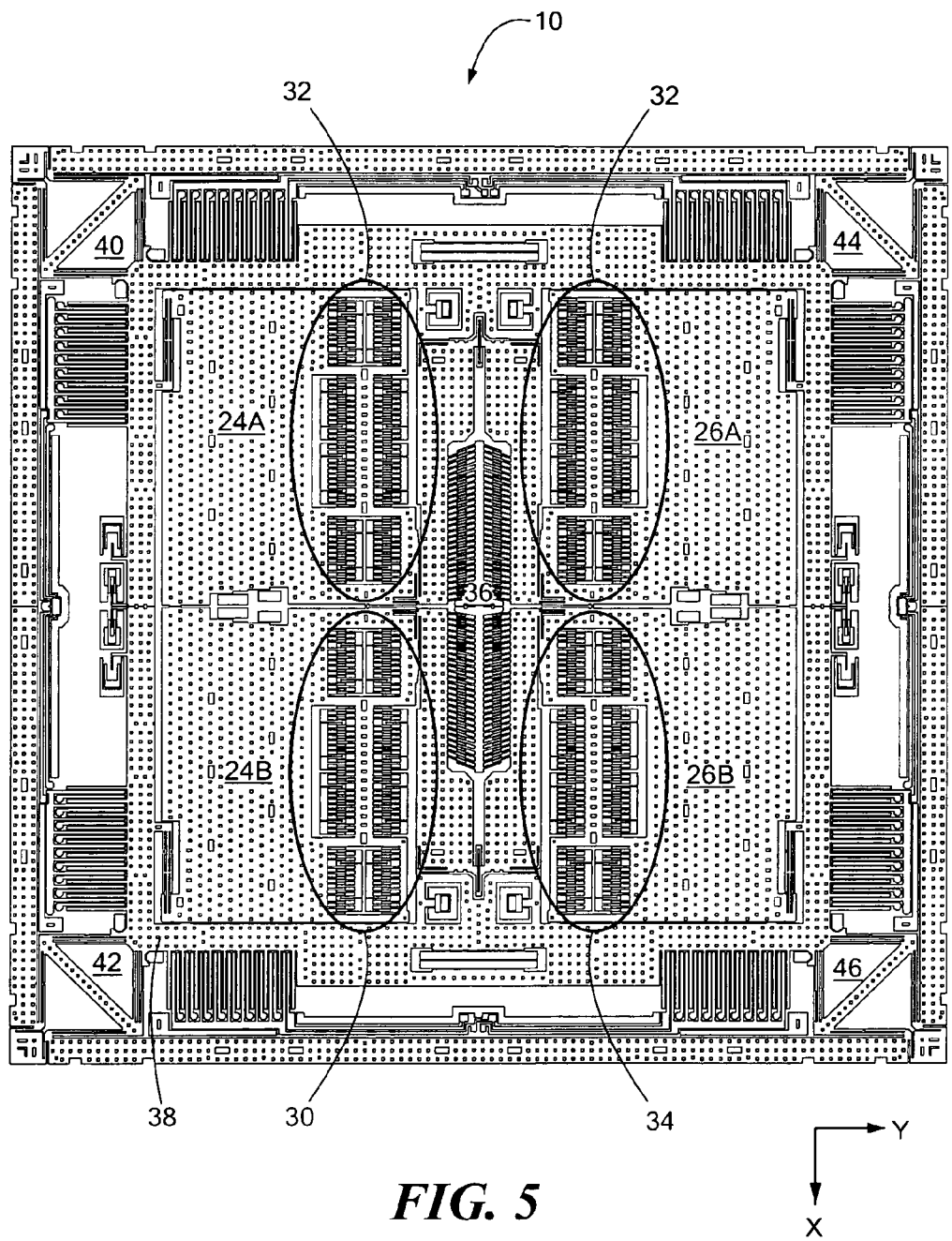
FIG. 5 shows the gyroscope of FIG. 4 with relevant components identified.

FIG. 5 shows the gyroscope of FIG. 4 with relevant components identified. Specifically, lobes 24A and 24B are the lobes of a first split mass, while lobes 26A and 26B are lobes of a second split mass. The lobes 24A, 24B, 26A, and 26B are associated with drive arrangements 28, 30, 32, and 34, respectively. The lobes are interconnected through various levers, pivot flexures, and forks 36. The lobes 24A, 24B, 26A, and 26B as well as the various levers, pivot flexures, and forks 36 are suspended within a frame 38 by various flexures and pivots (not specifically identified or described for the sake of simplicity). The frame 38 is suspended by four box suspensions 40, 42, 44, and 46, which severely restrict motion of the frame 38 in all but the rotational direction. For the sake of simplicity, many other features of the gyroscope 10 are not specifically identified or described.

Figure 6:
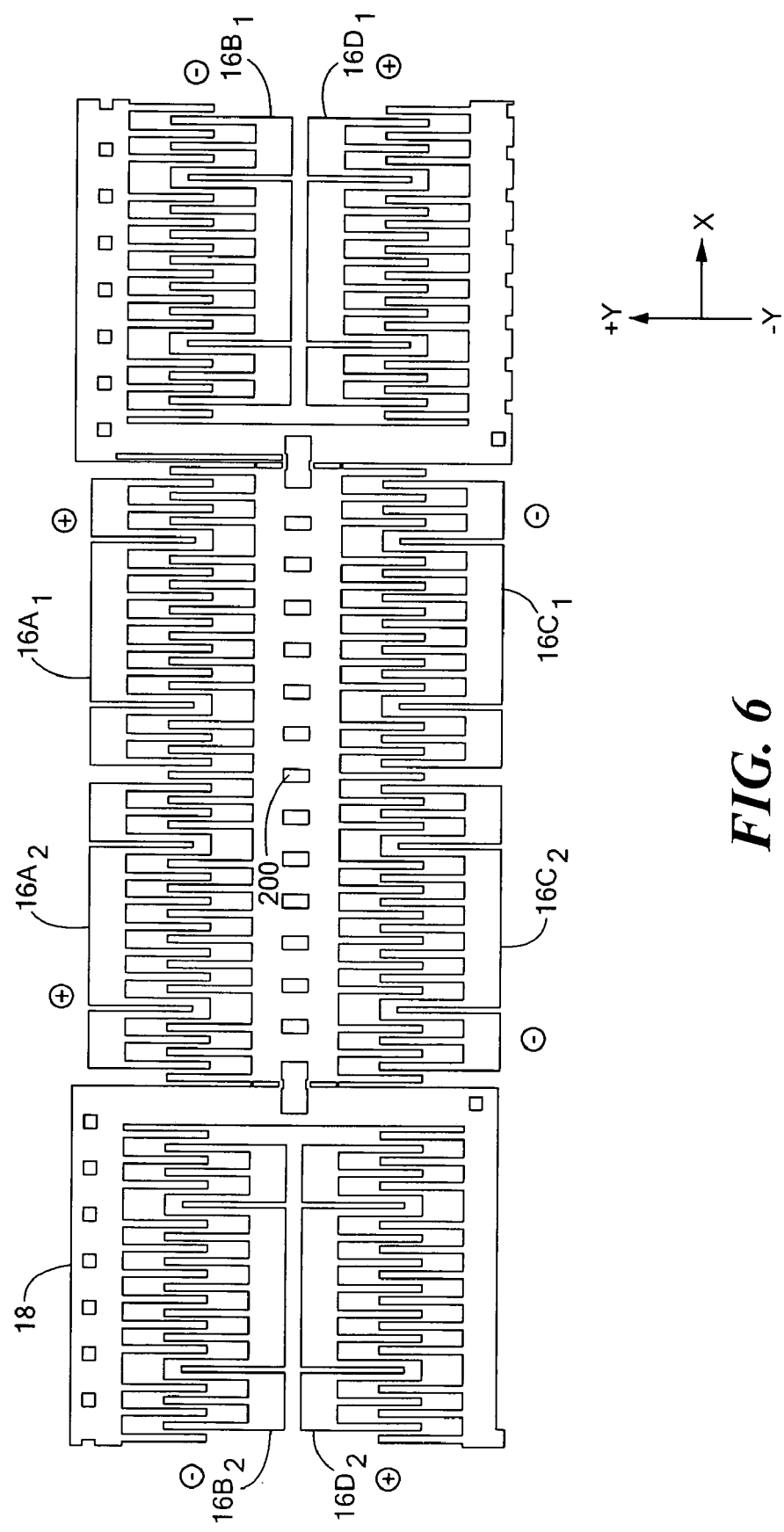
FIG. 6 schematically shows a blown-up view of one of the drive arrangements shown in FIG. 5.

FIG. 6 schematically shows a blown-up view of one of the drive arrangements shown in FIG. 5. As shown, the drive arrangement essentially includes a pair of drive arrays of the type described above with reference to FIGS. 1 and 2, arranged as mirror images to one another so as to have a common centroid. A first drive array includes fixed electrodes $16A_1$, $16B_1$, $16C_1$, and $16D_1$, while the second drive array includes fixed electrodes $16A_2$, $16B_2$, $16C_2$, and $16D_2$. The mass includes drive fingers 18 that interdigitate with the fingers of the various fixed electrodes. As discussed above, each drive array has a common centroid unto itself. Also, each drive arrangement consisting of a combination of two drive arrays has a common centroid substantially at the center point 200. Furthermore, the four drive arrangements 28, 30, 32, and 34 have a common centroid substantially at the center of the entire structure (i.e., at approximately the location of reference numeral 36 in FIG. 5.

Each drive array, which includes four fixed electrodes, is considered to form two pairs of diagonally opposed sets of fixed electrodes. Specifically, in the first drive array, fixed electrodes $16A_1$ and $16D_1$ constitute a first diagonally opposed set having fingers oriented in a first direction while fixed electrodes $16B_1$ and $16C_1$ constitute a second diagonally opposed set having fingers oriented in a second, opposite direction, and in the second drive array, fixed electrodes $16A_2$ and $16D_2$ constitute a first diagonally opposed set having fingers oriented in the first direction while fixed electrodes $16B_2$ and $16C_2$ constitute a second diagonally opposed set having fingers oriented in the second, opposite direction.

All fixed electrodes 16 having a (+) operate in phase with one another, while all fixed electrodes 16 having a (−) operate in phase with one another but 180 degrees out of phase with fixed electrodes 16 having a (+). Thus, fixed electrodes $16D_1$, $16A_1$, $16A_2$, and $16D_2$ operate in phase with one another, while fixed electrodes $16B_1$, $16C_1$, $16C_2$, and $16B_2$ operate in phase with one another but 180 degrees out of phase with fixed electrodes $16D_1$, $16A_1$, $16A_2$, and $16D_2$. When a charge is applied to fixed electrodes $16D_1$, $16A_1$, $16A_2$, and $16D_2$, the mass is pulled in the +Y direction. When a charge is applied to fixed electrodes $16B_1$, $16C_1$, $16C_2$, and $16B_2$, the mass is pulled in the −Y direction. Thus, by alternating charge between the fixed electrodes $16D_1$, $16A_1$, $16A_2$, and $16D_2$ and the fixed electrodes $16B_1$, $16C_1$, $16C_2$, and $16B_2$, the mass is resonated back and forth along the Y axis.

Figure 7A:
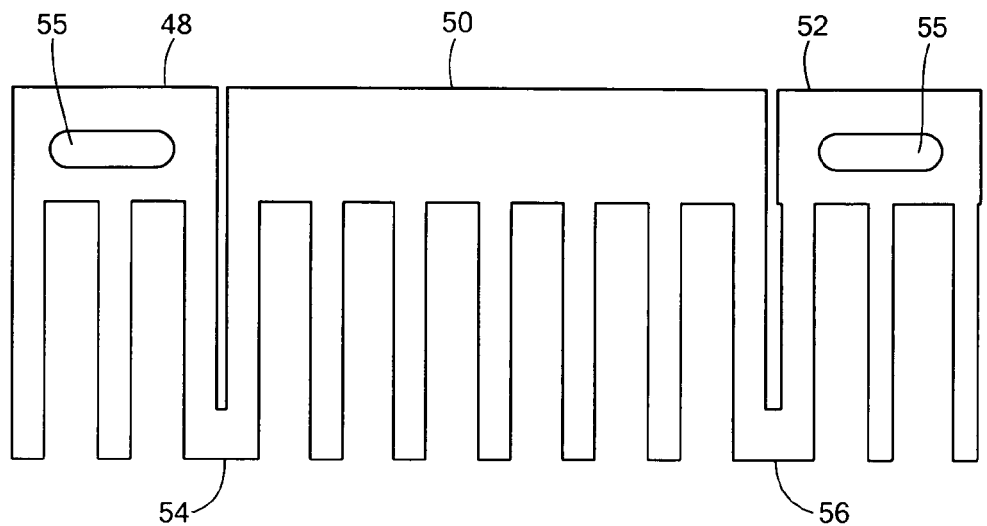
FIG. 7A schematically shows a blown-up view of one of the fixed electrodes shown in FIG. 6.
Figure 7B:
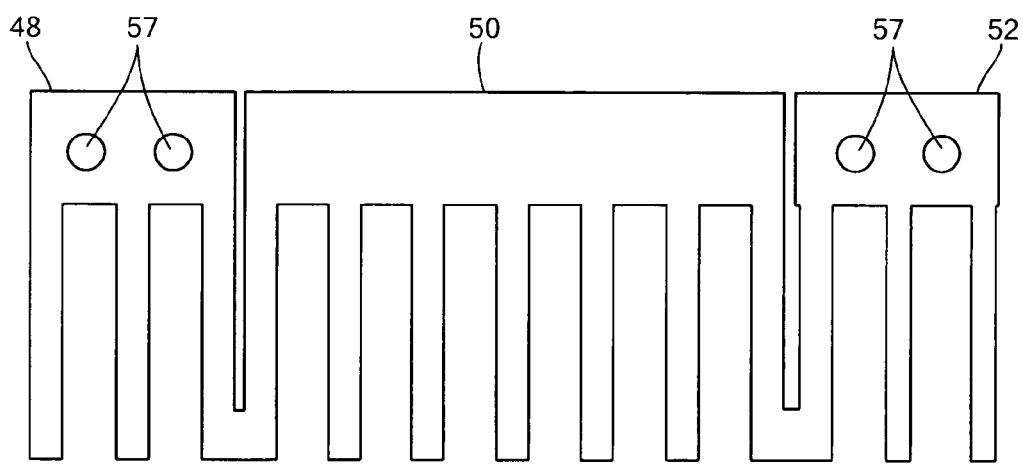
FIG. 7B schematically shows an alternative blown-up view of one of the fixed electrodes shown in FIG. 6.

FIG. 7A schematically shows a blown-up view of one of the fixed electrodes shown in FIG. 6. As shown, the fixed electrode can be considered to have three sections 48, 50, and 52. The two outer sections 48 and 52 are anchored to the underlying substrate 14. The middle section 50 is not anchored to the underlying substrate 14 but instead is suspended from the outer sections 48 and 52 by tethers 54 and 56, respectively, so as to float above the underlying substrate. The two outer sections 48 and 52 are preferably anchored to the underlying substrate 14 in such a way as to substantially prevent any twisting movement of the outer sections. In the example shown in FIG. 7A, each of the outer sections 48 and 52 is anchored by a single elongated anchor 55 that substantially prevents twisting movement of the outer section. In an alternative embodiment shown in FIG. 7B, each of the outer sections 48 and 52 is anchored by a pair of anchors 57. Other anchor configurations are possible.

Figure 8:
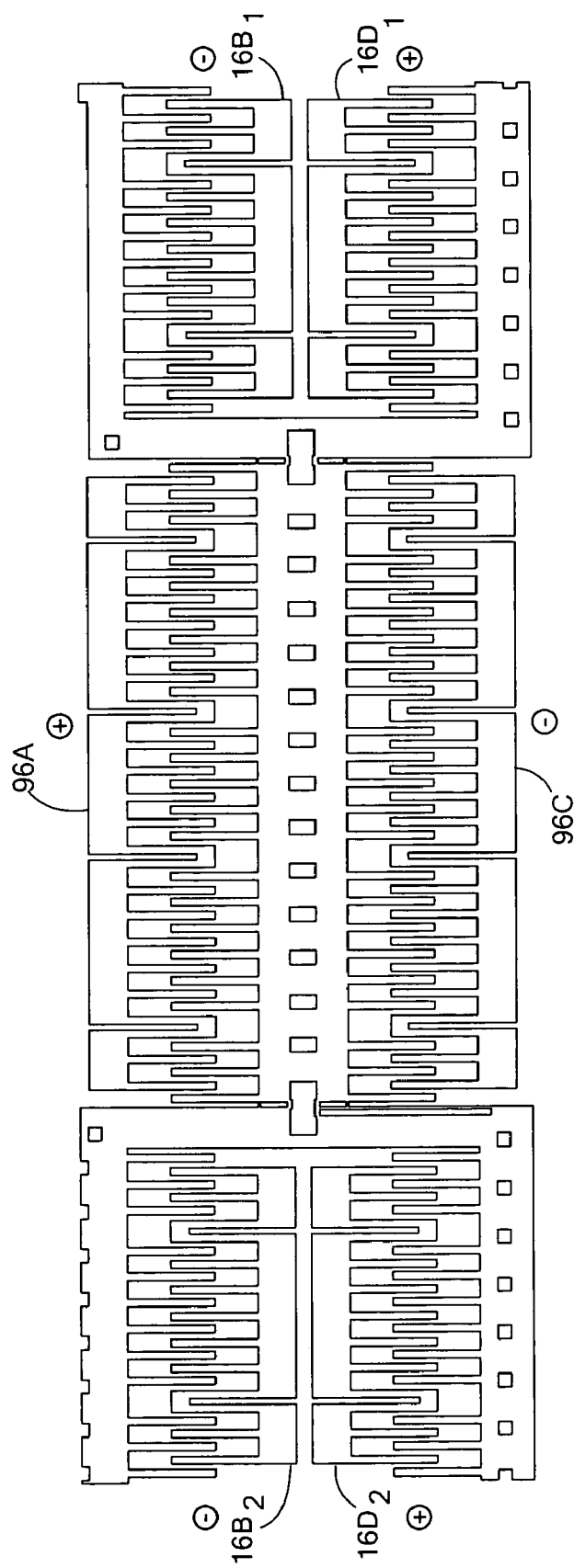
FIG. 8 schematically shows an alternative drive arrangement in accordance with illustrative embodiments of the invention.

The drive arrangement shown and described with reference to FIG. 6 is one of many that can be considered to form a common centroid. Other common centroid drive arrangements are possible. For example, in an alternative embodiment of the invention shown in FIG. 8, the fixed electrodes $16A_1$ and $16A_2$ can be combined into a single large fixed electrode 96A and the fixed electrodes $16C_1$ and $16C_2$ can similarly be combined into a single large fixed electrode 96C. To provide a common centroid configuration, the fixed electrodes 96A and 96C in the middle are approximately twice the size of the other fixed electrodes 16B and 16D.

It should be noted that discussion of a MEMS gyroscope 10 is exemplary. Accordingly, various embodiments of the invention may apply to other MEMS devices.

Although the above discussion discloses various exemplary embodiments of the invention, it should be apparent that those skilled in the art can make various modifications that will achieve some of the advantages of the invention without departing from the true scope of the invention.

What is claimed is:

1. Apparatus comprising:
    a resonator mass movable along an axis; and
    a drive arrangement for moving the mass along the axis, the drive arrangement having a plurality of fixed electrodes operably coupled so as to have a common centroid, wherein the drive arrangement comprises:
    a first fixed electrode oriented in a first direction;
    a second fixed electrode adjacent to the first fixed electrode and oriented in a second direction opposite the first direction;
    a third fixed electrode opposite the first fixed electrode and oriented in the second direction; and
    a fourth fixed electrode opposite the second fixed electrode and oriented in the first direction, wherein the first and fourth fixed electrodes operate in phase with one another, and wherein the second and third fixed electrodes operate in phase with one another and in anti-phase with the first and fourth fixed electrodes.

2. Apparatus according to claim 1, wherein each fixed electrode includes a plurality of fixed fingers that interdigitate with corresponding drive fingers of the mass such that there is a region in which the fixed fingers overlap with the drive fingers, and wherein the fixed electrodes are arranged such that the center lines of the overlap regions associated with adjacent fixed electrodes are co-linear and parallel to the axis.

3. Apparatus according to claim 1, wherein the drive arrangement further comprises:
    a fifth fixed electrode adjacent to the second fixed electrode and oriented in the second direction;
    a sixth fixed electrode opposite the fifth fixed electrode and oriented in the first direction;
    a seventh fixed electrode adjacent to the fifth fixed electrode and oriented in the first direction; and
    an eighth fixed electrode opposite the seventh fixed electrode and oriented in the second direction, wherein the first, fourth, sixth, and seventh fixed electrodes operate in phase with one another, and wherein the second, third, fifth, and eighth fixed electrodes operate in phase with one another and in anti-phase with the first, fourth, sixth, and seventh fixed electrodes.

4. Apparatus according to claim 1, wherein the drive arrangement further comprises:
    a fifth fixed electrode adjacent to the second fixed electrode and oriented in the first direction; and
    a sixth fixed electrode opposite the fifth fixed electrode and oriented in the second direction, wherein the first, fourth, and fifth fixed electrodes operate in phase with one another, and wherein the second, third, and sixth fixed electrodes operate in phase with one another and in anti-phase with the first, fourth, and fifth fixed electrodes.

5. Apparatus according to claim 4, wherein the first, third, fifth, and sixth electrodes are substantially identical to one another, and wherein the second and fourth fixed electrodes are substantially identical to one another and are approximately twice the size of the first, third, fifth, and sixth fixed electrodes.

6. Apparatus according to claim 1, wherein each fixed electrode includes at least two outer sections anchored to an underlying substrate and a middle section suspended from the outer sections so as to float above the underlying substrate.

7. Apparatus according to claim 6, wherein the outer sections are anchored using at least one of an elongated anchor and a plurality of anchors.

8. Apparatus according to claim 1, wherein the resonator mass is suspended within a frame that is movably coupled to an underlying substrate.

9. Apparatus comprising a plurality of resonator masses, each resonator mass associated with at least one drive arrangement for moving the mass along an axis, each drive arrangement having a plurality of fixed electrodes operably coupled so as to have a common centroid, wherein the at least one drive arrangement comprises:
a first fixed electrode oriented in a first direction;
a second fixed electrode adjacent to the first fixed electrode and oriented in a second direction opposite the first direction;
a third fixed electrode opposite the first fixed electrode and oriented in the second direction; and
a fourth fixed electrode opposite the second fixed electrode and oriented in the first direction, wherein the first and fourth fixed electrodes operate in phase with one another, and wherein the second and third fixed electrodes operate in phase with one another and in anti-phase with the first and fourth fixed electrodes.

10. Apparatus according to claim 9, wherein each fixed electrode includes a plurality of fixed fingers that interdigitate with corresponding drive fingers of the mass such that there is a region in which the fixed fingers overlap with the drive fingers, and wherein the fixed electrodes of each drive arrangement are arranged such that the center lines of the overlap regions associated with adjacent fixed electrodes are co-linear and parallel to the axis.

11. Apparatus according to claim 9, wherein the drive arrangement further comprises:
a fifth fixed electrode adjacent to the second fixed electrode and oriented in the second direction;
a sixth fixed electrode opposite the fifth fixed electrode and oriented in the first direction;
a seventh fixed electrode adjacent to the fifth fixed electrode and oriented in the first direction; and
an eighth fixed electrode opposite the seventh fixed electrode and oriented in the second direction, wherein the first, fourth, sixth, and seventh fixed electrodes operate in phase with one another, and wherein the second, third, fifth, and eighth fixed electrodes operate in phase with one another and in anti-phase with the first, fourth, sixth, and seventh fixed electrodes.

12. Apparatus according to claim 9, wherein the drive arrangement further comprises:
a fifth fixed electrode adjacent to the second fixed electrode and oriented in the first direction; and
a sixth fixed electrode opposite the fifth fixed electrode and oriented in the second direction, wherein the first, fourth, and fifth fixed electrodes operate in phase with one another, and wherein the second, third, and sixth fixed electrodes operate in phase with one another and in anti-phase with the first, fourth, and fifth fixed electrodes.

13. Apparatus according to claim 12, wherein the first, third, fifth, and sixth electrodes are substantially identical to one another, and wherein the second and fourth fixed electrodes are substantially identical to one another and are approximately twice the size of the first, third, fifth, and sixth fixed electrodes.

14. Apparatus according to claim 9, wherein each fixed electrode includes at least two outer sections anchored to an underlying substrate and a middle section suspended from the outer sections so as to float above the underlying substrate.

15. Apparatus according to claim 14, wherein the outer sections are anchored to the underlying substrate using at least one of an elongated anchor and a plurality of anchors.

16. Apparatus according to claim 9, wherein the plurality of resonator masses includes two masses operably coupled to resonate in anti-phase with one another.

17. Apparatus according to claim 16, wherein each of the resonator masses is split into two interconnected lobes, and wherein each lobe is associated with a drive arrangement.

18. Apparatus according to claim 9, wherein the plurality of resonator masses are suspended within a frame that is movably coupled to an underlying substrate.

* * * * *